United States Patent
Edling et al.

(10) Patent No.: US 9,911,458 B1
(45) Date of Patent: Mar. 6, 2018

(54) APPARATUS FOR MINIMIZING CROSS TRACK INTERFERENCE FOR OPTICAL TAPE

(71) Applicant: Oracle International Corporation, Redwood City, CA (US)

(72) Inventors: Dwayne Edling, Mead, CO (US); Faramarz Mahnad, Brookline, MA (US); Matthew Fienberg, Northborough, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/251,522

(22) Filed: Aug. 30, 2016

(51) Int. Cl.
 G11B 7/00 (2006.01)
 G11B 20/10 (2006.01)
 G11B 7/003 (2006.01)

(52) U.S. Cl.
 CPC ........ *G11B 20/10212* (2013.01); *G11B 7/003* (2013.01)

(58) Field of Classification Search
 None
 See application file for complete search history.

(56) References Cited

U.S. PATENT DOCUMENTS

| | | | | |
|---|---|---|---|---|
| 4,928,187 A * | 5/1990 | Rees | ...................... | H03M 5/145 360/40 |
| 5,287,478 A * | 2/1994 | Johnston | ............... | G06F 3/0601 360/48 |
| 5,321,557 A * | 6/1994 | Shimotashiro | ..... | G11B 5/00865 360/65 |
| 5,406,425 A * | 4/1995 | Johnston | ............... | G06F 3/0601 360/48 |
| 5,561,566 A * | 10/1996 | Kigami | .................. | G11B 5/012 360/48 |
| 5,655,050 A * | 8/1997 | Yamamoto | ......... | G11B 20/1208 360/40 |
| 6,157,604 A * | 12/2000 | Feyh | ................ | G11B 20/10037 369/124.01 |
| 6,188,535 B1 * | 2/2001 | Lemke | ................. | G11B 5/0086 360/70 |
| 6,266,318 B1 * | 7/2001 | Honda | .................... | G11B 7/007 369/275.3 |
| 6,407,969 B1 * | 6/2002 | Spruit | ................ | G11B 7/00745 369/275.3 |
| 6,430,356 B1 * | 8/2002 | Hara | ........................ | G11B 5/86 360/15 |

(Continued)

*Primary Examiner* — Peter Vincent Agustin
(74) *Attorney, Agent, or Firm* — Invoke (57) ABSTRACT

In at least one embodiment, an optical data storage tape including a plurality of tracks is provided. The plurality of tracks include a first track having a plurality of first informational fields configured to store one of first positional information indicative of a location on an optical tape and a first predetermined sequence of data. The plurality of tracks further include a second track located adjacent to the first track and having a plurality of second informational fields configured to store one of second positional information indicative of the location on the optical tape and a second predetermined sequence of data. The first positional information is located adjacent to the second predetermined sequence of data on the optical tape to minimize cross track interference during a read operation.

22 Claims, 7 Drawing Sheets

(56) References Cited

U.S. PATENT DOCUMENTS

| | | | | |
|---|---|---|---|---|
| 6,754,026 B1* | 6/2004 | Koski | ............... | G11B 5/584 |
| | | | | 360/73.04 |
| 2002/0198678 A1* | 12/2002 | Koski | ............... | G01B 5/02 |
| | | | | 702/164 |
| 2005/0083602 A1* | 4/2005 | Saliba | ............... | G11B 5/584 |
| | | | | 360/77.12 |
| 2005/0243698 A1* | 11/2005 | Yamanaka | ......... | G11B 7/24082 |
| | | | | 369/275.4 |
| 2006/0227446 A1* | 10/2006 | Elliott | ............... | G11B 5/012 |
| | | | | 360/39 |
| 2007/0036042 A1* | 2/2007 | Monen | ............ | G11B 7/0938 |
| | | | | 369/27.01 |
| 2007/0177292 A1* | 8/2007 | Bui | ............ | G11B 20/10037 |
| | | | | 360/46 |
| 2007/0206477 A1* | 9/2007 | Raniuk | ............ | G11B 5/584 |
| | | | | 369/97 |
| 2014/0268395 A1* | 9/2014 | Shaver | ............ | G11B 20/1252 |
| | | | | 360/48 |

* cited by examiner

APPARATUS FOR MINIMIZING CROSS TRACK INTERFERENCE FOR OPTICAL TAPE

TECHNICAL FIELD

Aspects disclosed herein generally relate to an apparatus to minimize cross track interference for an optical tape. These aspects and others will be discussed in more detail herein.

BACKGROUND

A drum is used to imprint a track pattern on an optical tape. The track pattern on the optical tape generally comprises a plurality of lands and grooves. In some cases, one or more of the lands and grooves may be formed with a slight wobble pattern. In other cases, one or more of the lands and grooves may be formed in a straight line pattern (i.e., or not contain the wobble pattern). A particular track on the optical tape that exhibits the wobble pattern with respect to the land and groove can provide the same phase as the land and groove on an adjacent track. Conversely, a particular track on the optical tape that exhibits the wobble pattern with respect to the land and groove can provide a different phase with respect to a land and a groove on the adjacent track. These aspects may lead to cross-talk interference as the wobble pattern may be decoded and used as embedded positional information for the tape.

SUMMARY

In at least one embodiment, an optical data storage tape including a plurality of tracks is provided. The plurality of tracks includes a first track having a plurality of first informational fields configured to store one of first positional information indicative of a location on an optical tape and a first predetermined sequence of data. The plurality of tracks further includes a second track positioned adjacent to the first track and having a plurality of second informational fields configured to store one of second positional information indicative of the location on the optical tape and a second predetermined sequence of data. The first positional information is located adjacent to the second predetermined sequence of data on the optical tape to minimize cross track interference during a read operation.

In at least another embodiment, an optical data storage tape including a plurality of tracks is provided. The plurality of tracks include an even track having a plurality of first informational fields, each first informational field is configured to store one of first positional information indicative of a location on an optical tape and a first predetermined sequence of data. The plurality of tracks include an odd track positioned adjacent to the even track and having a plurality of second informational fields, each second informational field is configured to store one of second positional information indicative of the location on the optical tape and a second predetermined sequence of data. The first positional information is located adjacent to the second predetermined sequence of data on the optical tape to minimize cross track interference during a read operation.

In at least another embodiment, an apparatus including an embosser drum is provided. The embosser drum is configured to imprint a nanostructure pattern onto an exterior of an optical tape that forms a plurality of tracks including: (i) a first track having a plurality of first informational fields configured to store one of first positional information indicative of a location on an optical tape and a first predetermined sequence of data; and (ii) a second track positioned adjacent to the first track and having a plurality of second informational fields configured to store one of second positional information indicative of the location on the optical tape and a second predetermined sequence of data. The first positional information is located adjacent to the second predetermined sequence of data on the optical tape to minimize cross track interference.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
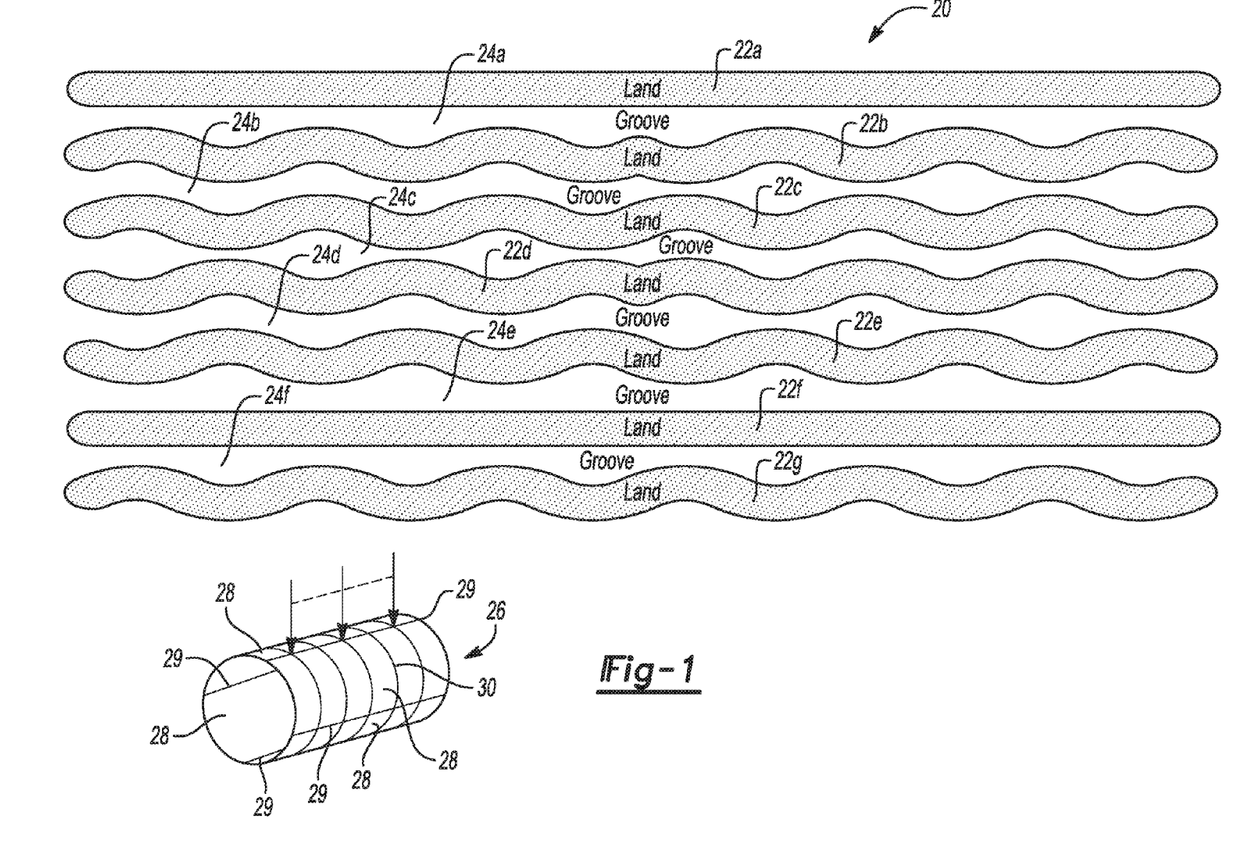
FIG. 1 depicts a top view of an optical tape with a plurality of lands and grooves formed thereon.

FIG. 1 depicts a top view of an optical tape 20 with a plurality of lands (or tracks) 22a-22g ("22") and a plurality of grooves 24a-24f ("24") formed thereon. An embossing drum (or drum) 26 that includes a plurality of shims 28 and a plurality of seams 29 is used to imprint a nanostructure pattern 30 (see radial lines that traverse the seams 29 on the drum 26) on the optical tape 20. The plurality of shims 28 are welded together to form the drum 26. It is also recognized that the drum 26 may be formed without the use of shims 28. The nanostructure pattern 30 is imprinted on an exterior (or outer) surface of the drum 26.

While the drum 26 rotates about a central axis, the drum 26 imprints the nanostructure pattern 30 on the optical tape 20, which forms the plurality of lands 22 and the plurality of grooves 24. The nanostructure pattern 30 may also provide positional information for the tracks 22 when the imprinting operation is performed. Each land 22 generally corresponds to a track on the optical tape 20 that is a capable of receiving/storing data and having such data read by a tracking servo system that includes an optical pickup unit (OPU) (not shown). Each land 22 is generally elevated in reference to a corresponding groove 24. As shown, the various lands 22 and grooves 24 may exhibit a wobbled pattern due to the rotation of the drum 26 on the optical tape 20 when the nanostructure pattern 30 is imprinted onto the optical tape 20. In other instances, one or more of the tracks 22 (see land 22f) may exhibit a straight line pattern on the optical tape 20. The wobble pattern of the lands (or tracks) 22 may have the same phase (e.g., see lands 22b, 22c) at certain locations along the track between adjacent tracks 22. In addition, the wobble pattern of the lands 22 may have an opposite phase (e.g., see lands 22c, 22d) between adjacent tracks 22 at certain locations along the track 22. In general, the wobble pattern of the lands 22 may create cross track wobble interference (CTWI) whereby the neighboring tracks and its corresponding wobble patterns may adversely affect the manner in which positional information is read from the tracks 22.

Consider for example when the tracking servo system is reading the positional information from the tracks 22. Generally, the tracking servo system emits a laser beam onto the tracks 22 when reading the positional information from the tracks 22. For example, the tracking servo system provides the laser that is centered in the middle of a target track 22 when reading positional information therefrom. The laser (or laser spot on the track 22) is generally larger than the target track (or land) 22 and the edges of the laser beam may land on both sides of the target track 22. Since the spot of the laser beam may span several adjacent tracks 22, the geometry of the wobble pattern of the adjacent tracks 22 may affect a target track wobble pattern signal. In general, a photo detector IC quadrature sensor (not shown) is configured to detect the reflectivity of the laser beam off of the tracks 22. The presence of the wobble pattern of the adjacent tracks 22 affects (or changes) the reflection of the laser beam from the target land 22 given the laser beam spans several tracks. This change in reflectivity either increases or decreases the strength of the signal that is picked up by the photo detector IC quadrature sensor. As such, the wobble pattern of adjacent tracks 22 to the target track 22 during the read operation may result in incorrect positional information that read from the optical tape 20 when accessing the positional information for the tracks 22. This condition is generally known as the CTWI condition.

Figure 2:
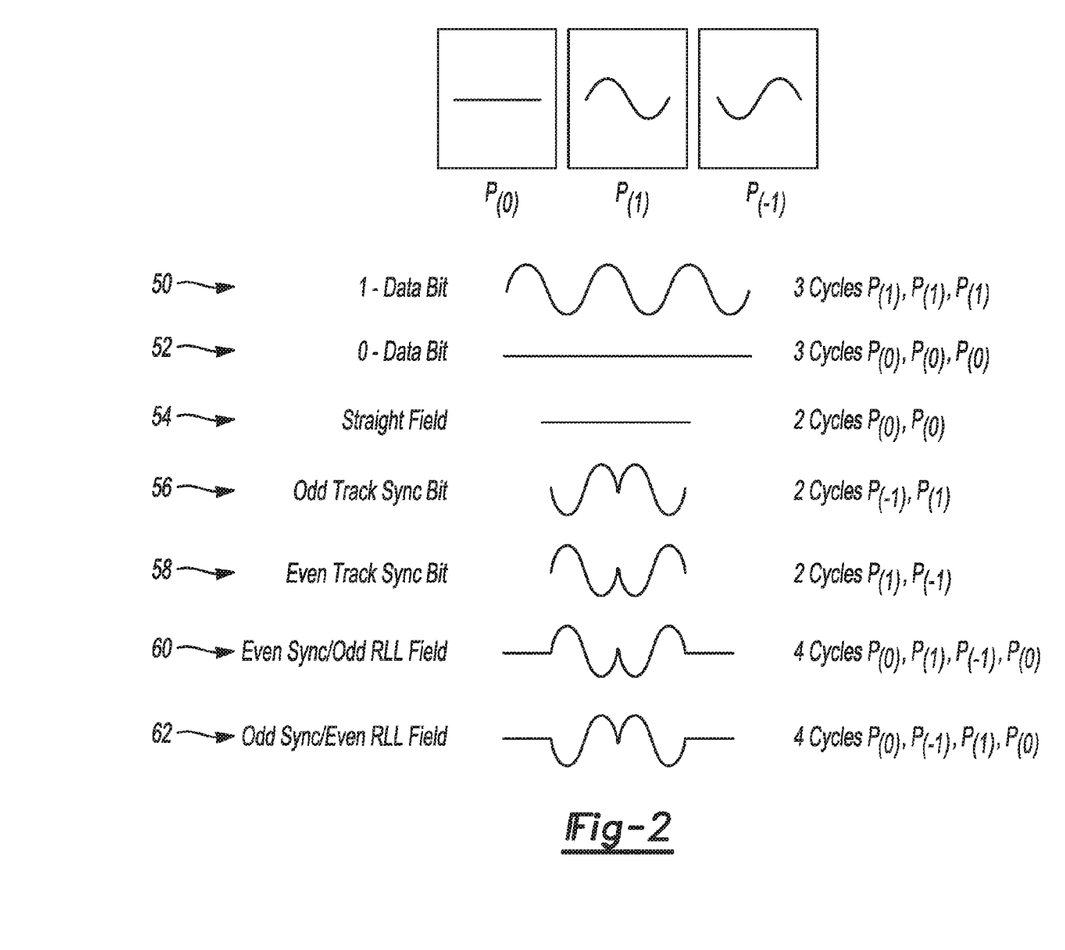
FIG. 2 depicts wobble pattern cycles on the optical tape in three forms.

FIG. 2 depicts pattern cycles P(0), P(1), and P(−1) of the tracks 22 on the optical tape 20, as well as corresponding electrical signals representing the patterns cycles. In general, the drum 26 may master the pattern cycles P(0), P(1), and P(−1) on the optical tape 20. The cycles may then be combined to represent the information shown in connection to elements 50, 52, 54, 56, 58, 60, and 62. Element 50 generally represents a single data bit that is equal to one and formed with 3 cycles of P(1). Element 52 generally represents a single data bit equal to zero and formed of 3 cycles of P(0). Element 54 corresponds to a straight field that generally includes at least two cycles of P(0). Element 56 corresponds to an odd track sync bit field that generally includes two cycles with a first cycle corresponding to P(−1) and a second cycle corresponding to P(1). Element 58 corresponds to an even track sync bit field, which generally includes two cycles with a first cycle corresponding to P(1) and a second cycle corresponding to P(−1). Element 60 corresponds to an even sync/odd RLL field that includes 4 cycles corresponding to P(0), P(1), P(−1), and P(0). Element 62 corresponds to an even sync/even RLL field that includes 4 cycles corresponding to P(0), P(1), P(−1), and P(0).

Figure 3:
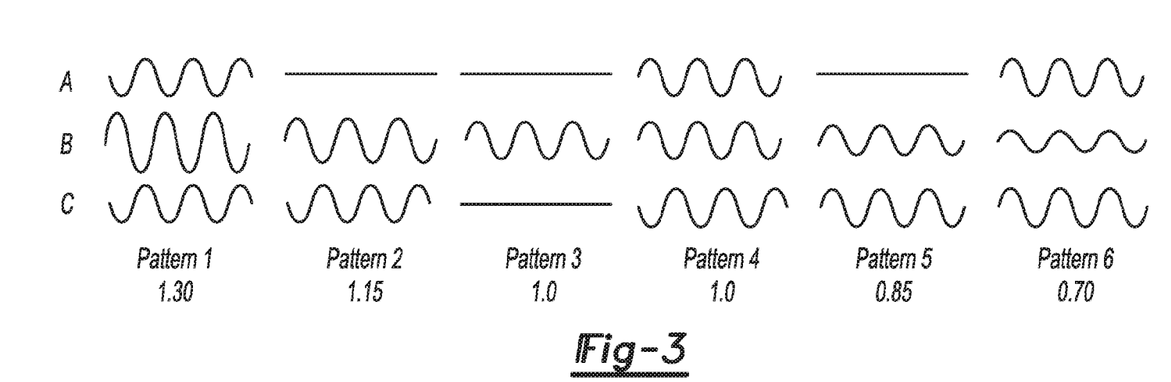
FIG. 3 depicts the effect of each geometry for the wobble pattern cycle for various patterns.

FIG. 3 depicts the effect of the geometry for each wobble pattern cycle for various patterns (e.g., patterns 1, 2, 3, 4, 5, and 6) for tracks A and C in relation to track B which has a "1" bit imprinted thereon. For purposes of explanation, track B as illustrated in FIG. 3, may be considered to be the target track from which positional information is being read. As shown in pattern 1, tracks A and C include ones that have an opposite phase to the value of track B. The waveform as shown for track B corresponds to the detected reflectivity on the pattern for the positional information on track B and the captured signal strength (or amplitude) of the reflected signal exhibits, for example, a 30% increase. In pattern 2, track A is a zero and track C is a one that has an opposite phase to track B. This condition results in an increase of amplitude for track B, for example, by 15%.

In pattern 3, tracks A and C are zero and have no effect on the amplitude of track B. In pattern 4, tracks A and C are ones with an opposite phase from each other and cancel out any effect on track B. In pattern 5, track C includes ones and has the same phase of track B. This condition results in a decrease of amplitude for track B, for example, by 15%. In pattern 6, tracks A and C are ones with the same phase as track B and reduce the amplitude of track B, for example, by 30%.

Figure 4:
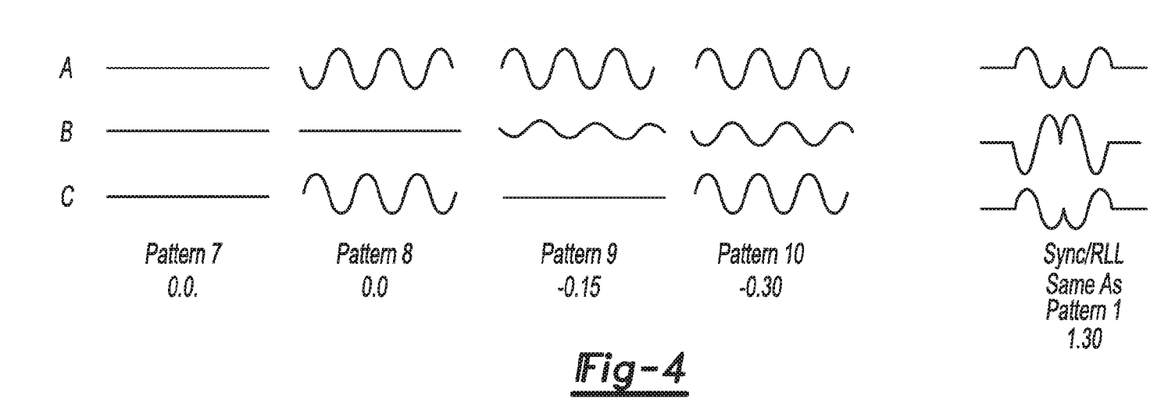
FIG. 4 depicts the effect of each geometry on a zero pattern and on a sync bit.

FIG. 4 depicts the effect of the geometry for each pattern cycle for various patterns 7-10 for tracks A and C in relation to track B and in relation to a sync/RLL field. Track B includes a "0" bit imprinted thereon. In pattern 7, tracks A and C are zeros and have no effect on the phase or amplitude of track B. In pattern 8, tracks A and C are ones with an opposite phase from one another and cancel out any effect on track B. In pattern 9, track A includes one and track C includes zeros and provides, for example, a −15% (opposite phase) effect on the amplitude of track B. In pattern 10, tracks A and C include ones with the same phase as one another. This condition results in, for example, a 30% decrease of the amplitude of track B. As shown in sync/RLL field on the right hand side of FIG. 4, tracks A and C each provide a pattern that includes a one followed by a zero. This condition is out of phase with respect to track B for the sync/RLL field. This condition yields a 30% increase in the amplitude of track B for data in the sync/RLL field. In general, patterns 3, 7, 9, and 10 are the only patterns that may occur during the imprinting of the nanostructure pattern 30 onto the optical tape 20.

Figure 5:
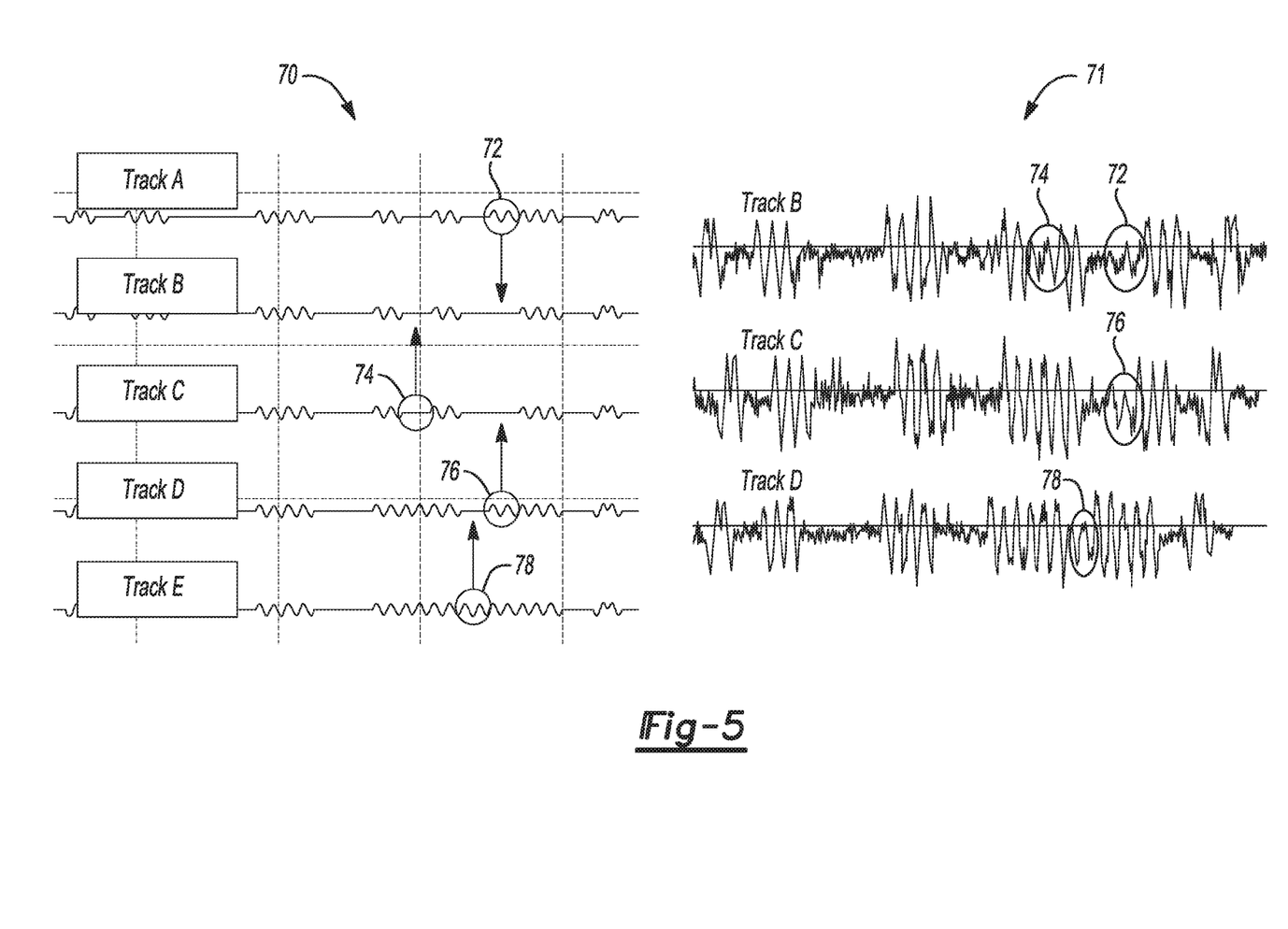
FIG. 5 depicts a media master wobble pattern cycle and corresponding media wobble signal.

FIG. 5 depicts a media master wobble pattern cycle 70 (or wobble pattern cycle 70) and corresponding media wobble signal 71. As shown in connection with the media master wobble pattern cycle 70, tracks A-E are provided. Various locations 72, 74, 76, and 78 are depicted on the wobble pattern cycle 70. The media wobble signal 71 (see right hand side of the plot) illustrates the manner in which the signal 70 is adversely affected by the CTWI condition at the corresponding locations 72, 74, 76, and 78. As shown in the wobble pattern cycle 70 at location 72, the data pattern on tracks A, B, and C is similar to pattern 9 (see pattern 9 in FIG. 4). Thus, it can be seen at location 72 as illustrated on track B on the corresponding media 70 (see left hand side of the plot), this condition yields a −15% (opposite phase)

effect on the amplitude of track B. This creates the condition where the data incorrectly looks like a "1" as opposed to the proper reading of "0". In short, locations 74, 76, and 78 of the wobble pattern cycle 70 are similar to pattern 9 thus creating the condition where the data incorrectly looks like a "1" as opposed to the proper reading of a "0." Locations 74, 76, and 78 on the wobble pattern cycle 70 generally depict the arrangement shown in pattern 9, however these locations can be turned upside down or shown opposite to pattern 9 as illustrated in FIG. 4. This condition still yields a 15% (opposite phase) effect on the amplitude of tracks B, C and D for locations 74, 76, and 78, respectively (see locations 74, 76, and 78 on the media wobble signal 70 as illustrated in right hand side of FIG. 5).

Figure 6:
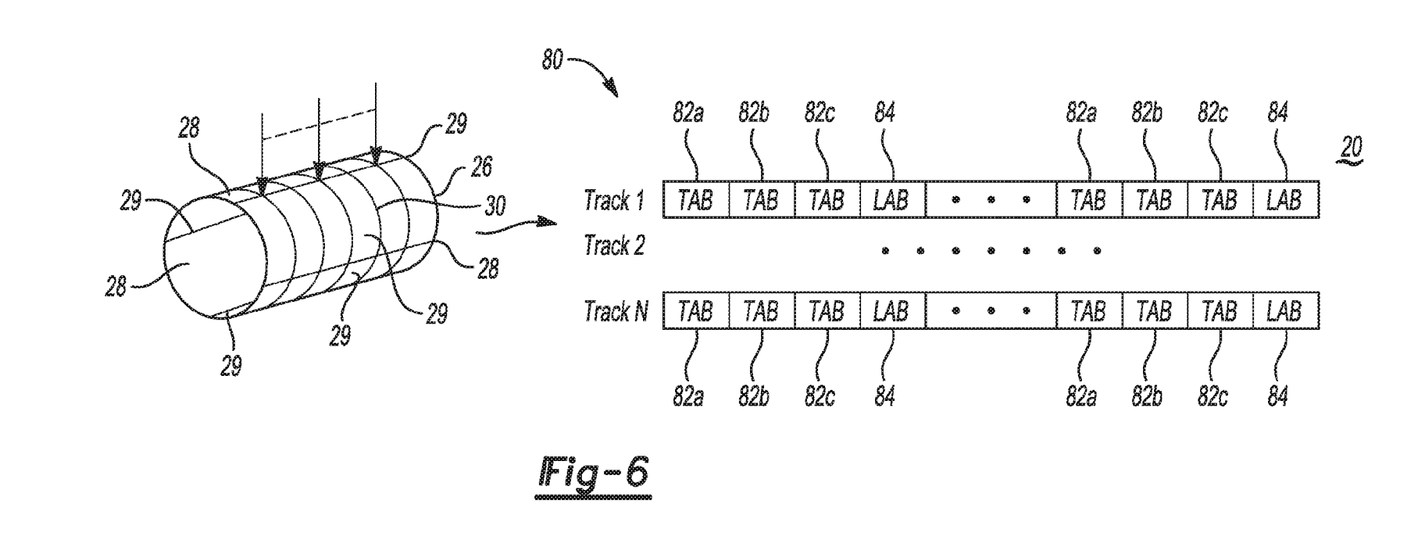
FIG. 6 depicts an embosser drum and a corresponding wobble address block in accordance to one embodiment.

FIG. 6 depicts the drum 26 and a corresponding wobble address block 80 in accordance to one embodiment of the present invention. The drum 26 is arranged to imprint the wobble address block 80 onto the optical tape 20. Specifically, the nanostructure pattern 30 is configured to imprint the wobble address block 80 onto the optical tape 20 during the embossing or imprinting operation. The wobble address block 80 includes a plurality of track address blocks 82 (or 82a-82c) and a plurality of linear address blocks 84. Each track 22 of the optical tape 20 may include a corresponding sequence of track address blocks 82a-82c, followed by a linear address block 84, for example, as depicted in FIG. 6.

In general, the track address block (TAB) 82 includes address information (i.e., positional information) for the track 22 and is used by the tracking servo system to locate the laser beam or to place the laser beam on the target track 22. Generally, the address information serves as positional information which indicates a particular location (or track) of the optical tape 20. The linear address block (LAB) 84 generally includes both address information for the track 22 and linear address information (i.e., each of which may also be defined as positional information) and is used by the tracking servo system to precisely locate a track 22 linearly within one rotation of the drum 26 at approximately 500 mm.

Figure 7:
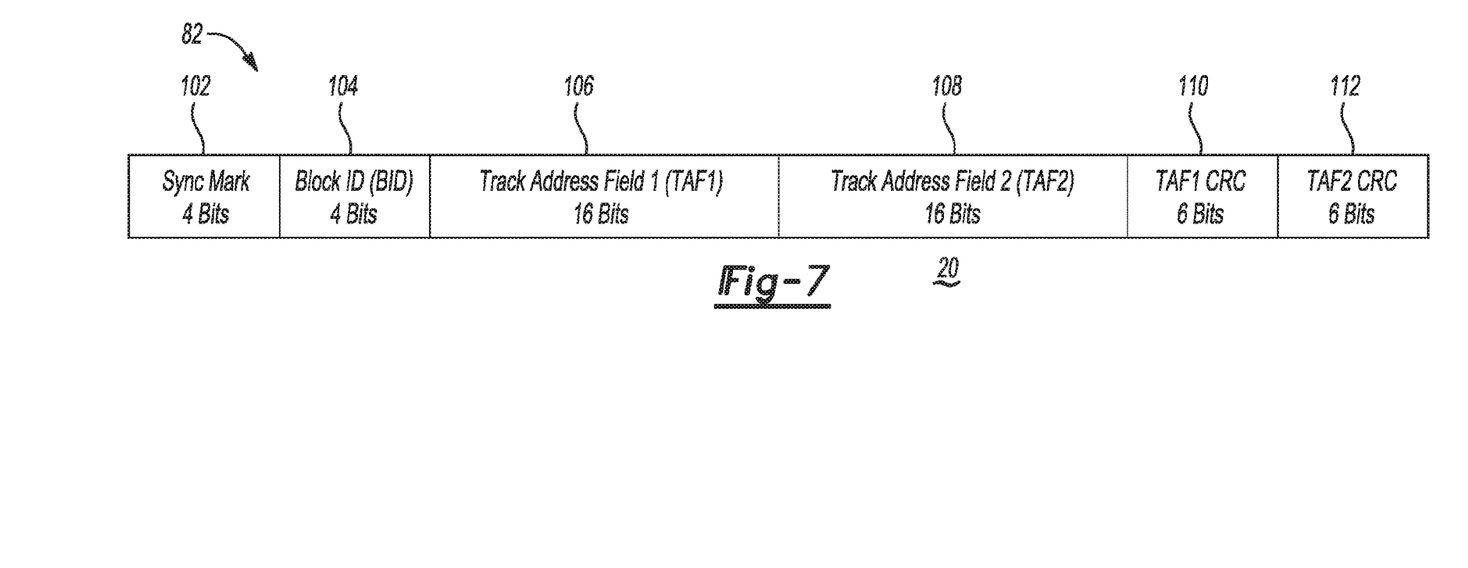
FIG. 7 depicts a track address block as formed on the optical tape in accordance to one embodiment.

FIG. 7 depicts the TAB 82 as formed or encoded on the optical tape 20 by the nanostructure pattern 30 of the drum 26 in accordance to one embodiment. The TAB 82 generally includes a sync mark field 102, a block ID field 104, a first track address field (TAF1) 106, a second track address field (TAF2) 108, a first track address field (TAF1) cyclic redundancy check (CRC) field 110, and a second track address field (TAF2) cyclic redundancy check (CRC) field 112. The TAF1 106 and the TAF2 108 correspond to informational fields for storing positional information of the optical tape 20. The sync mark field 102 generally includes a unique four bit wobble cycle pattern s used by the tracking servo system to identify the beginning of each TAB 82.

The block ID field 104 generally includes 4 bits of data that identify the block type as exhibited below in Table 1 (e.g., see first two rows of Table 1 as these only apply to the TAB 82):

TABLE 1

Block ID Field Contents

| Block ID Field | | | | |
|---|---|---|---|---|
| bit 1 | bit 2 | bit 3 | bit 4 | |
| 1 | 0 | 0 | 0 | Even Track Address Block (TAB) |
| 0 | 1 | 0 | 0 | Odd Track Address Block (TAB) |

TABLE 1-continued

Block ID Field Contents

| Block ID Field | | | | |
|---|---|---|---|---|
| bit 1 | bit 2 | bit 3 | bit 4 | |
| 0 | 0 | 1 | 0 | Even track Linear Address Block (LAB) |
| 0 | 0 | 0 | 1 | Odd track Linear Address Block (LAB) |

The TAF1 field 106 includes information corresponding to the track addresses of odd numbered tracks 22 and zeros (or a zero field or a null set) for all even numbered tracks 22. The TAF2 field 108 includes information corresponding to the track addresses of even numbered tracks 22 and zeros (or a zero field) for all odd numbered tracks 22. In general, the data as arranged in the TAF1 field 106 and the TAF2 field 108 are such that any track addresses that are specified in either the TAF1 field 106 or the TAF2 field 108 are positioned adjacent to the zero field to eliminate CTWI condition. This will be discussed in more detail below. The first TAF CRC field 110 includes six bits of data used to detect errors in accidental changes of data in the TAF1 field 106. The second TAF CRC field 112 includes six bits of data that are used to detect error in accidental changes of data in the TAF2 field 108. While not shown, various Run Length Limit (RLL) fields are inserted every four bits after the sync mark field 102.

Figure 8:
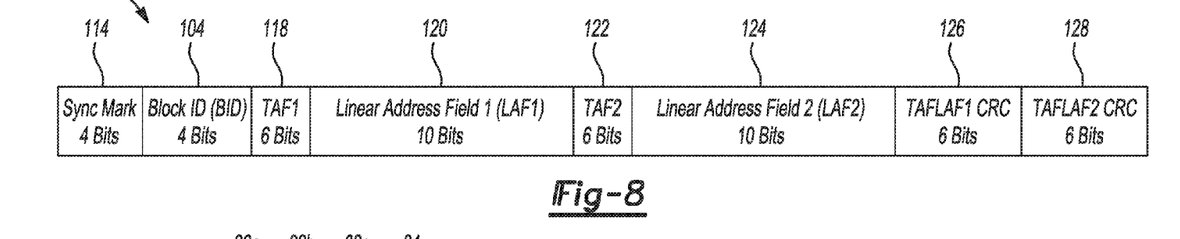
FIG. 8 depicts a linear address block as formed on the optical tape in accordance to one embodiment.

FIG. 8 depicts the LAB 84 as formed or encoded on the optical tape 20 by the nanostructure pattern 30 of the drum 26 in accordance to one embodiment. The LAB 84 generally includes a sync mark field 114, the block ID field 104, a TAF1 118 (only six bits), a first linear address field (LAF1) 120, a TAF2 field 122 (only six bits), a second linear address field (LAF2) 124, a first track address field/linear address field (TAFLAF1) cyclic redundancy check (CRC) field 126 (or TAFLAF1 CRC field), and a second track address field/linear address field (TAFLAF2) cyclic redundancy check (CRC) field 128 (or TAFLAF2 CRC field). The TAF 118, the CAF1 120, the TAF2 122, and the LAF2 124 correspond to informational fields for storing positional information of the optical tape 20. The sync mark field 114 generally includes a unique 4 bit wobble cycle pattern that is used by the tracking servo system to identify the beginning of each LAB 84.

As noted above, the block ID field 104 generally includes 4 bits of data that identify the block type as exhibited above in Table 1 (e.g., see the last two rows of Table 1 as these only apply to the LAB 84).

The TAF1 field 118 includes the least significant six bits of the track address for odd numbered tracks 22 and all zeros for even numbered tracks 22. The LAF1 field 120 includes linear address information for the rotation of the drum 26 for odd numbered tracks 22 and all zeros for even numbered tracks 22. The TAF2 field 122 includes the least significant six bits of the track address for even numbered tracks 22 and all zeros for odd numbered tracks 22. The LAF2 field 124 includes linear address information for the rotation of the drum 26 for odd numbered tracks 22 and all zeros for even numbered tracks 22. In general, the data as arranged in the TAF1 field 118, the LAF1 field 120, the TAF2 field 122, and the LAF2 field 124 are arranged to be adjacent to a corresponding zero field to eliminate the CTWI condition. This will be discussed in more detail below.

The TAFLAF1 CRC field 126 includes six bits of data used to detect errors in accidental changes of data in the TAF1 field 118 and in the LAF1 field 120. The TAFLAF2 CRC field 128 includes six bits of data used to detect error in accidental changes of data in the TAF2 field 122 and in the LAF2 field 124. In addition, the TAFLAF1 CRC field 126 and the TAFLAF2 CRC field 128 are arranged to be adjacent to a corresponding zero field to eliminate the CTWI condition. While not shown, various Run Length Limit (RLL) fields are inserted every four bits after the sync mark field 114.

Figures 9, 10:
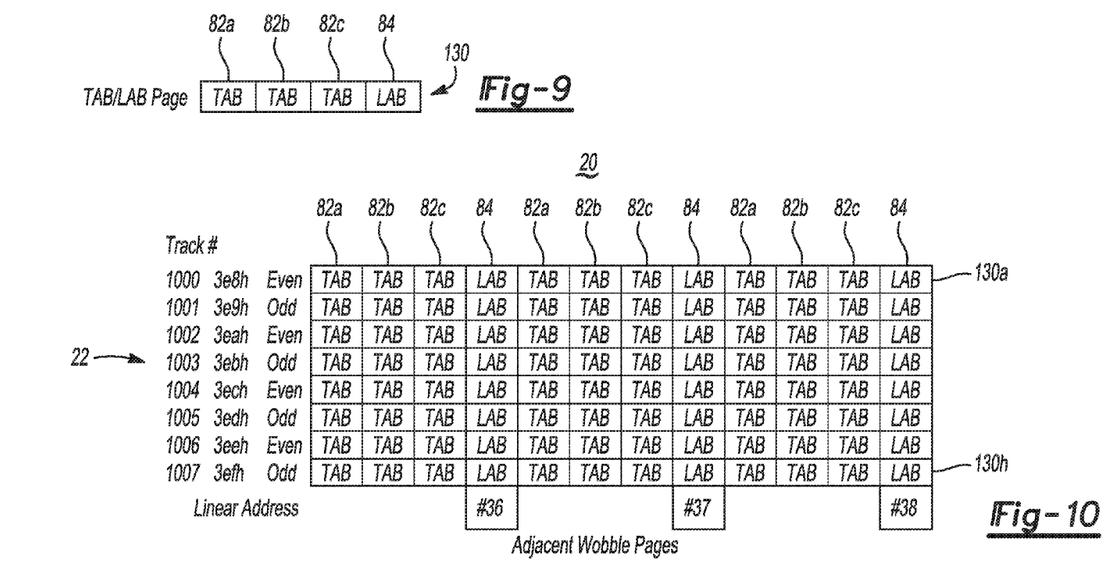
FIG. 9 depicts a plurality of track address blocks and the linear address block in accordance to one embodiment.
FIG. 10 depicts corresponding tracks and a predetermined sequence of track address blocks and linear address blocks in accordance to one embodiment.

FIG. 9 depicts a plurality of TABs 82a-82c and the LAB 84 in accordance to one embodiment. In general, the plurality of TABs 82a-82c and the LAB 84 as illustrated in FIG. 9 form a wobble page 130 on the optical tape 20.

FIG. 10 depicts a number of wobble pages, including the plurality of TABs 82a-82c and the LAB 84, as set forth on corresponding tracks 22 of the optical tape 20. As can be seen, even and odd tracks 22 will each include a corresponding wobble page 130a-130h in the manner shown.

Figure 11:
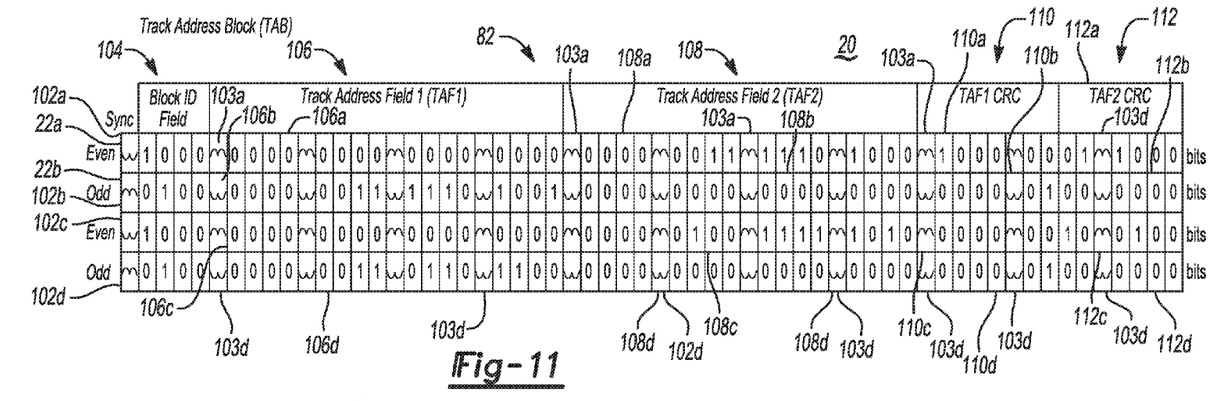
FIG. 11 depicts the contents of the track address block on the optical tape in accordance to one embodiment.

FIG. 11 depicts the contents of the TABs 82 on the optical tape 20 in accordance to one embodiment. Each track 22a, 22b, 22c, 22d includes a corresponding TAB 82a, 82b, 82c, and 82d respectively. Track 22a is defined as an even track and the sync field 102 of TAB 82a includes two cycles, a first cycle corresponding to P(−1) and a second cycle corresponding to P(1) (see element 58 in connection with FIG. 2). Track 22c is also an even track and includes a sync field 102c with similar contents to the sync field 102a. Tracks 22b and 22d are defined as odd tracks and also include the sync fields 102b and 102d, respectively.

In general, the TAF1 fields 106a and 106c (i.e., in the even tracks 22a and 22c) are populated with a predetermined sequence of data such as, for example, a null set (i.e., zero set) so the adjacent TAF1 field 106b on the odd track 22b is not impacted by any cross talk from any data in the corresponding fields. Thus, it can be seen that all TAF1 fields 106 in the even tracks 22a, 22c include the null set of data so as not to interfere with the valid information in the TAF1 fields 106 for the odd tracks 22b, 22d that include valid information. During the imprinting process, the nanostructure pattern 30 of the drum 26 is arranged to imprint the null set into the TAF1 fields 106 for even tracks 22a, 22c. The pattern of imprinting the null set into the TAF1 fields 106 for any of the even tracks 22a, 22c while including valid information in the TAF1 fields 106 for the odd tracks 22a, 22c positioned between the even tracks 22a, 22c is similar to pattern 3 as set forth in FIG. 3. It was noted that such a pattern avoids cross talk on the data and further avoids a negative effect on the amplitude of the data in the odd track 22. In short, the nanostructure pattern 30 imprints: (i) valid information on a first track, (ii) the predetermined sequence of data, for example, a null set on a second track positioned directly above (or directly adjacent to) the first track, and (iii) a null set on a third track positioned directly below (or directly adjacent to) the first track so as to avoid the CTWI condition. This alternating pattern of placing a null set on the even tracks 22a, 22c and placing valid data on odd tracks 22b, 22d is utilized for all tracks 22 in the TAF1 fields 106 on the optical tape 20.

For the TAF2 fields 108, the even tracks 22a, 22c are populated with valid data while the odd tracks 22b, 22d are positioned with the null set to avoid CTWI with the valid data on the even tracks 22a, 22c. This alternating pattern of placing a null set on the odd tracks 22a, 22c and placing valid data on odd tracks 22b, 22d is utilized for all tracks 22 in the TAF2 fields 108 on the optical tape 20.

For the TAF1 CRC fields 110, the odd tracks 22b, 22d are populated with valid data while the even tracks 22a, 22c are positioned with the null set to avoid CWTI with the valid data on the odd tracks 22b, 22d. This alternating pattern of placing a null data set on the even tracks 22a, 22c and placing valid data on odd tracks 22b, 22d is utilized for all tracks 22 in the TAF1 CRC fields 110 on the optical tape 20.

For the TAF2 CRC fields 112, the even tracks 22a, 22c are populated with valid data while the odd tracks 22b, 22d are positioned with the null set to avoid CTWI with the valid data on the even tracks 22a, 22c. This alternating pattern of placing a null set on the odd tracks 22b, 22d and placing valid data on the even tracks 22a, 22c is utilized for all tracks 22 in the TAF2 fields 112 on the optical tape 20. A run length limit (RLL) field 103a-103d is inserted in every track 22 every four bits after the sync mark field 102. In general, the polarity of data in the sync field 102 is opposite to the polarity of data in the corresponding RLL field 103 to distinguish between the sync field 102 and the RLL field 103. As also shown, the data in the sync field 102 alternates in polarity between the even and odd tracks 122 to increase the overall amplitude of the data in the sync field 102. In general, the TAB 82 is configured to store the predetermined data sequence after the imprinting process.

The corresponding fields of the TAB 82 may have the following cycles of $W_L$ (where $W_L$ is generally defined as the wobble cycle pattern 70 length and is equal to 10.27 µm) and corresponding length as depicted below:

| Field Name | $W_{L(cycles)}$ | Length (µm) |
| --- | --- | --- |
| Sync Field | 4 | 41.08 |
| Block ID Field | 12 | 123.24 |
| RLL Field | 4 | 41.08 |
| TAF Address Field 1 Nibble | 12 | 123.24 |
| RLL Field | 4 | 41.08 |
| TAF Address Field 1 Nibble | 12 | 123.24 |
| RLL Field | 4 | 41.08 |
| TAF Address Field 1 Nibble | 12 | 123.24 |
| RLL Field | 4 | 41.08 |
| TAF Address Field 1 Nibble | 12 | 123.24 |
| RLL Field | 4 | 41.08 |
| TAF Address Field 2 Nibble | 12 | 123.24 |
| RLL Field | 4 | 41.08 |
| TAF Address Field 2 Nibble | 12 | 123.24 |
| RLL Field | 4 | 41.08 |
| TAF Address Field 2 Nibble | 12 | 123.24 |
| RLL Field | 4 | 41.08 |
| TAF Address Field 2 Nibble | 12 | 123.24 |
| RLL Field | 4 | 41.08 |
| TAF1 CRC Nibble | 12 | 123.24 |
| RLL Field | 4 | 41.08 |
| TAF1 CRC | 6 | 61.62 |
| TAF2 CRC | 6 | 61.62 |
| RLL Field | 4 | 41.08 |
| TAF2 CRC Nibble | 12 | 123.24 |
| Total TAB | 192 | 1,971.80 |

Figure 12:
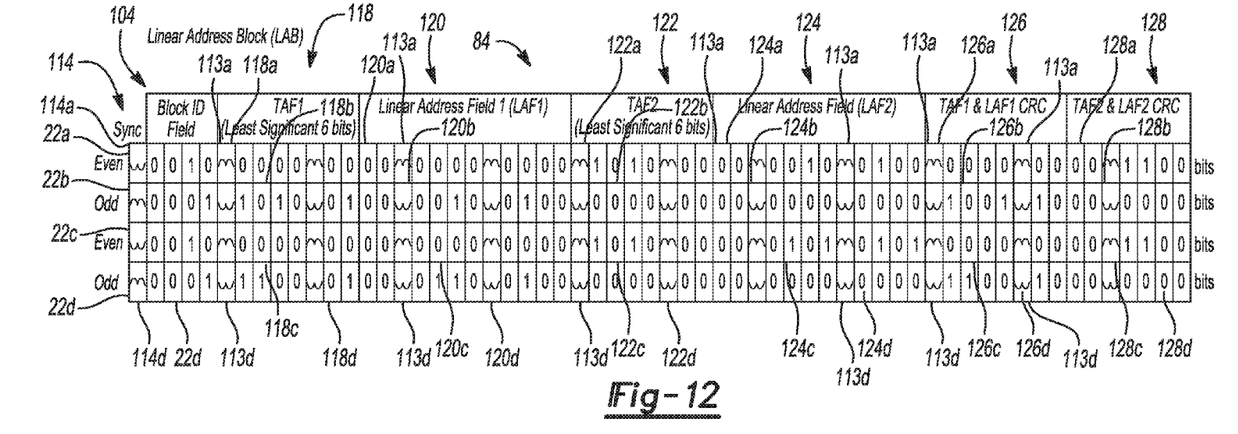
FIG. 12 depicts the contents of the linear address block on the optical tape in accordance to one embodiment.

FIG. 12 depicts contents of the LAB 84 on the optical tape 20 in accordance to one embodiment. Each track 22a, 22b, 22c, 22d includes a corresponding LAB 84a, 84b, 84c, and 84d respectively. Tracks 22a and 22c are defined as even tracks and include the sync fields 114a and 114c, respectively and the RLL fields 113a and 113c, respectively. Tracks 22b and 22d are defined as odd tracks and include the sync fields 114b and 114d and the RLL fields 113b and 113d, respectively.

In general, the TAF1 fields 118a and 118c and the LAF1 fields 120a and 120c (i.e., in the even tracks 22a and 22c) store the predetermined sequence of data, for example, a null set (i.e., zero set) so that the adjacent TAF1 field 118b and the LAF1 field 120b in the odd track 22b is not impacted by any cross talk from any data in these corresponding fields. Thus, it can be seen that all TAF1 fields 118 and the LAF1 fields 120 in the even tracks 22a, 22c include the null data set so as to not to interfere with the data in the TAF1 fields 118 and the LAF1 fields 120 for the odd tracks 22b, 22d that include valid information. During the imprinting process, the nanostructure pattern 30 of the drum 26 may be arranged to imprint the null data set into the TAF1 fields 118 and the LAF1 fields 120 for even tracks 22. The pattern of imprinting the null data set into the TAF1 fields 118 and the LAF1 fields 120 for any of the even tracks 22a, 22c while including valid information in the TAF1 fields 118 and the LAF1 fields 120 for the odd tracks 22b, 22d positioned between the even tracks 22a, 22c is similar to pattern 3 as set forth in FIG. 3. It was noted that such a pattern avoids cross talk in between the data and further avoids a negative effect on the amplitude of the data in the odd track 22b, 22d. In short, the nanostructure pattern 30 imprints: (i) valid data (or positional information and/or other information) on a first track; (ii) the predetermined sequence of data such as, for example, a null data set on a second track positioned directly above (or directly adjacent to) the first track, and (iii) a null data set on a third track positioned directly below (or directly adjacent to) the first track to avoid CWTI condition. This alternating pattern of placing a null set on the even tracks 22a, 22c and placing valid information on odd tracks 22b, 22d is utilized for all tracks 22 in the TAF1 fields 118 and in the LAF1 fields 120 on the optical tape 20.

For the TAF2 fields 122 and the LAF2 fields 124, the even tracks 22a, 22c are populated with valid data while the odd tracks 22b, 22d are populated with the null set to avoid CTWI with the valid data on the even tracks 22a, 22c. This alternating pattern of placing a null set on the odd tracks 22a, 22c and placing valid data on odd tracks 22b, 22d is utilized for all tracks 22 in the TAF2 fields 122 and in the LAF2 fields 124 on the optical tape 20.

For the TAFLAF1 CRC fields 126, the odd tracks 22b, 22d are populated with valid data while the even tracks 22a, 22c are populated with the null set to avoid CTWI with the valid data on the even tracks 22a, 22c. This alternating pattern of placing a null set on the even tracks 22a, 22c and placing valid data on odd tracks 22b, 22d is utilized for all tracks 22 in the TAFLAF1 CRC fields 126 on the optical tape 20.

For the TAFLAF2 CRC fields 128, the even tracks 22a, 22c are populated with valid data while the odd tracks 22b, 22d are populated with the null set to avoid CTWI with the valid data on the even tracks 22a, 22c. This alternating pattern of placing a null set on the odd tracks 22b, 22d and placing valid data on the even tracks 22a, 22c is utilized for all tracks 22 in the TAFLAF2 CRC fields 128 on the optical tape 20. The run length limit (RLL) field 113a-113d is inserted in every track 22 every four bits after the sync mark field 102. In general, the polarity of data in the sync field 114 is opposite to the polarity of data in the corresponding RLL field 113 to distinguish between the sync field 114 and the RLL field 113. As also shown, the data in the sync field 104 alternates in polarity between the even and odd tracks 22 to increase the overall amplitude of the data for the sync field 114. In general, the LAB 84 is configured to store the predetermined data sequence after the imprinting process.

The corresponding fields of the LAB 84 may have the following cycles of $W_L$ and corresponding length as depicted below:

| Field Name | $W_{L(cycles)}$ | Length (μm) |
|---|---|---|
| Sync Field | 4 | 41.08 |
| Block ID Field | 12 | 123.24 |
| RLL Field | 4 | 41.08 |
| Track Address Field 1 LSB | 12 | 123.24 |
| RLL Field | 4 | 41.08 |
| Track Address Field 1 LSB | 6 | 61.62 |
| Linear Address Field 1 | 6 | 61.62 |
| RLL Field | 4 | 41.08 |
| Linear Address Field 1 | 12 | 123.24 |
| RLL Field | 4 | 41.08 |
| Linear Address Field 1 | 12 | 123.24 |
| RLL Field | 4 | 41.08 |
| Track Address Field 2 LSB | 12 | 123.24 |
| RLL Field | 4 | 41.08 |
| Track Address Field 2 LSB | 6 | 61.62 |
| Linear Address Field 2 | 6 | 61.62 |
| RLL Field | 4 | 41.08 |
| Linear Address Field 2 | 12 | 123.24 |
| RLL Field | 4 | 41.08 |
| Linear Address Field 2 | 12 | 123.24 |
| RLL Field | 4 | 41.08 |
| TAF1-LAF1 CRC | 12 | 123.24 |
| RLL Field | 4 | 41.08 |
| TAF1-LAF1 CRC | 6 | 61.62 |
| TAF2-LAF2 CRC | 6 | 61.62 |
| RLL Field | 4 | 41.08 |
| TAF2-LAF2 CRC | 12 | 123.24 |
| Total LAB | 192 | 1,971.80 |

The bits in the RLL field 103 or 113 are inserted every 4 bits after the block ID field 104. This aspect may allow for the generation of an accurate phase loop lock even if there is a long run of zeros in the TAB 82 and the LAB 84.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An optical data storage tape comprising:
   a plurality of tracks including:
      a first track having a plurality of first informational fields, represented by a first wobbled land and groove pattern, configured to store one of first positional information indicative of a location on an optical tape and a first predetermined sequence of data; and
      a second track positioned adjacent to the first track and having a plurality of second informational fields, represented by a second wobbled land and groove pattern, configured to store one of second positional information indicative of the location on the optical tape and a second predetermined sequence of data,
   wherein the first positional information is located adjacent to the second predetermined sequence of data on the optical tape to minimize cross track interference during a read operation.

2. The optical data storage tape of claim 1 wherein the first positional information is vertically adjacent to the second predetermined sequence of data on the optical tape.

3. The optical data storage tape of claim 2 wherein the second predetermined sequence of data includes two or more zero data bits positioned directly adjacent to one another to minimize the cross track interference during the read operation.

4. The optical data storage tape of claim 1 wherein the second positional information is located adjacent to the first predetermined sequence of data on the optical tape to minimize cross track interference during a read operation.

5. The optical data storage tape of claim 4 wherein the second positional information is vertically adjacent to the first predetermined sequence of data on the optical tape.

6. The optical data storage tape of claim 5 wherein the first predetermined sequence of data includes two or more zero data bits positioned directly adjacent to one another to minimize the cross track interference during the read operation.

7. The optical data storage tape of claim 1 wherein the plurality of first informational fields and the plurality of second informational fields form at least a portion of a track address block (TAB) that includes at least one track address field that stores a track address for odd numbered tracks or even numbered tracks on the optical tape.

8. The optical data storage tape of claim 7 wherein the TAB includes one or more of a sync field, a block identification field, a run length limit (RLL) field, and at least one cyclic redundancy check (CRC) field.

9. The optical data storage tape of claim 8 wherein the sync field includes data of alternating polarities on even and odd tracks to increase an amplitude of the sync field.

10. The optical data storage tape of claim 1 wherein the plurality of first informational fields and the plurality of second informational fields form at least a portion of a linear address block (LAB) that includes at least one linear address field that stores a linear address corresponding to one rotation of an embossing drum for one of odd and even numbered tracks.

11. The optical data storage tape of claim 10 wherein the LAB includes one or more of a sync field, a block identification field, a run length limit (RLL) field, and at least one cyclic redundancy check (CRC) field.

12. The optical data storage tape of claim 11 wherein the wherein the sync field includes data of alternating polarities on even and odd tracks to increase an amplitude of the sync field.

13. An optical data storage tape comprising:
a plurality of tracks including:
an even track having a plurality of first informational fields, represented by a first wobbled land and groove pattern, each first informational field configured to store one of first positional information indicative of a location on an optical tape and a first predetermined sequence of data; and
an odd track positioned adjacent to the even track and having a plurality of second informational fields, represented by a second wobbled land and groove pattern, each second informational field configured to store one of second positional information indicative of the location on the optical tape and a second predetermined sequence of data,
wherein the first positional information is positioned adjacent to the second predetermined sequence of data on the optical tape to minimize cross track interference during a read operation.

14. The optical data storage tape of claim 13 wherein the first positional information is vertically adjacent to the second predetermined sequence of data on the optical tape.

15. The optical data storage tape of claim 14 wherein the second predetermined sequence of data includes two or more zero data bits positioned directly adjacent to one another to minimize the cross track interference during the read operation.

16. The optical data storage tape of claim 13 wherein the second positional information is located adjacent to the first predetermined sequence of data on the optical tape to minimize cross track interference during a read operation.

17. The optical data storage tape of claim 16 wherein the second positional information is vertically adjacent to the first predetermined sequence of data on the optical tape.

18. The optical data storage tape of claim 17 wherein the first predetermined sequence of data includes two or more zero data bits positioned directly adjacent to one another to minimize the cross track interference during the read operation.

19. The optical data storage tape of claim 13 wherein the plurality of first informational fields and the plurality of second informational fields form at least a portion of a track address block (TAB) that includes at least one track address field that stores a track address for odd numbered tracks or even numbered tracks on the optical tape.

20. The optical data storage tape of claim 13 wherein the plurality of first informational fields and the plurality of second informational fields form at least a portion of a linear address block (LAB) that includes at least one linear address field that stores a linear address corresponding to one rotation of an embossing drum for one of odd and even numbered tracks.

21. An apparatus comprising:
an embosser drum having a nanostructure pattern configured to imprint onto an exterior of an optical tape a plurality of tracks including:
(i) a first track having a plurality of first informational fields, represented by a first wobbled land and groove pattern, configured to store one of first positional information indicative of a location on an optical tape and a first predetermined sequence of data; and
(ii) a second track positioned adjacent to the first track and having a plurality of second informational fields, represented by a second wobbled land and groove pattern, configured to store one of second positional information indicative of the location on the optical tape and a second predetermined sequence of data,
wherein the first positional information is located adjacent to the second predetermined sequence of data on the optical tape to minimize cross track interference.

22. The apparatus of claim 21 wherein the second positional information is located adjacent to the first predetermined sequence of data on the optical tape to minimize cross track interference during a read operation.

* * * * *

UNITED STATES PATENT AND TRADEMARK OFFICE
CERTIFICATE OF CORRECTION

PATENT NO. : 9,911,458 B1
APPLICATION NO. : 15/251522
DATED : March 6, 2018
INVENTOR(S) : Edling et al.

Page 1 of 1

It is certified that error appears in the above-identified patent and that said Letters Patent is hereby corrected as shown below:

In the Specification

In Column 5, Line 52, after "pattern" delete "s".

In Column 6, Line 43, delete "CAF1" and insert -- LAF1 --, therefor.

In the Claims

In Column 11, Lines 42-43, in Claim 12, delete "wherein the wherein the" and insert -- wherein the --, therefor.

Signed and Sealed this
Fifth Day of January, 2021

Andrei Iancu
*Director of the United States Patent and Trademark Office*